(12) United States Patent
Kowalchuk

(10) Patent No.: US 8,825,311 B2
(45) Date of Patent: Sep. 2, 2014

(54) METHOD AND APPARATUS FOR SIGNALING TO AN OPERATOR OF A FARM IMPLEMENT THAT THE FARM IMPLEMENT IS TRAVERSING A SEEDED AREA

(75) Inventor: Trevor Kowalchuk, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 673 days.

(21) Appl. No.: 12/985,080

(22) Filed: Jan. 5, 2011

(65) Prior Publication Data

US 2012/0173093 A1 Jul. 5, 2012

(51) Int. Cl.
G01C 21/00 (2006.01)
A01C 19/00 (2006.01)
A01B 79/00 (2006.01)

(52) U.S. Cl.
USPC .......... 701/50; 239/1; 239/23; 239/466; 239/487; 111/170; 111/905

(58) Field of Classification Search
USPC .......... 701/50, 23, 466, 487; 111/119, 118, 111/121, 127, 174, 200, 900, 903, 621; 340/990; 700/243; 172/179, 182, 200, 172/900
See application file for complete search history.

(56) References Cited

U.S. PATENT DOCUMENTS

| | | | |
|---|---|---|---|
| 5,967,066 A | 10/1999 | Giles et al. | |
| 5,980,163 A | 11/1999 | Gregor et al. | |
| 6,711,501 B2 | 3/2004 | McClure et al. | |
| 6,748,884 B1 | 6/2004 | Bettin et al. | |
| 7,091,855 B2 | 8/2006 | Barrieau | |
| 7,395,769 B2 | 7/2008 | Jensen | |
| 7,555,990 B2 | 7/2009 | Beaujot | |
| 7,690,440 B2 * | 4/2010 | Dean et al. | 172/179 |
| 2005/0126457 A1 | 6/2005 | Mayerle et al. | |
| 2005/0194779 A1 | 9/2005 | Ito | |
| 2010/0017073 A1 | 1/2010 | Landphair | |
| 2010/0032492 A1 * | 2/2010 | Grimm et al. | 239/1 |
| 2010/0162931 A1 | 7/2010 | Cannon et al. | |

FOREIGN PATENT DOCUMENTS

| | | |
|---|---|---|
| CA | 2503174 | 4/2006 |
| GB | 2429513 | 2/2007 |

* cited by examiner

Primary Examiner — Adam Tissot
(74) Attorney, Agent, or Firm — Rebecca L. Henkel

(57) ABSTRACT

A sectional control apparatus and method prompts the operator of an implement when the implement, or portion thereof, is traversing over land that has already been seeded and/or disturbed. The apparatus includes a GPS or GNSS receiver that communicates with a GPS or GNSS system and a controller that maps movement of the implement so that real-time positional data for the implement can be compared to the movement map. When the position of the implement, or portion thereof, is detected as moving over previously seeded and/or disturbed land, the controller activates an alert mechanism in the operator cab of the implement to notify the operator that sectional control, i.e., shutting down metering of product or raising the tool bar, needs to be implemented.

12 Claims, 21 Drawing Sheets

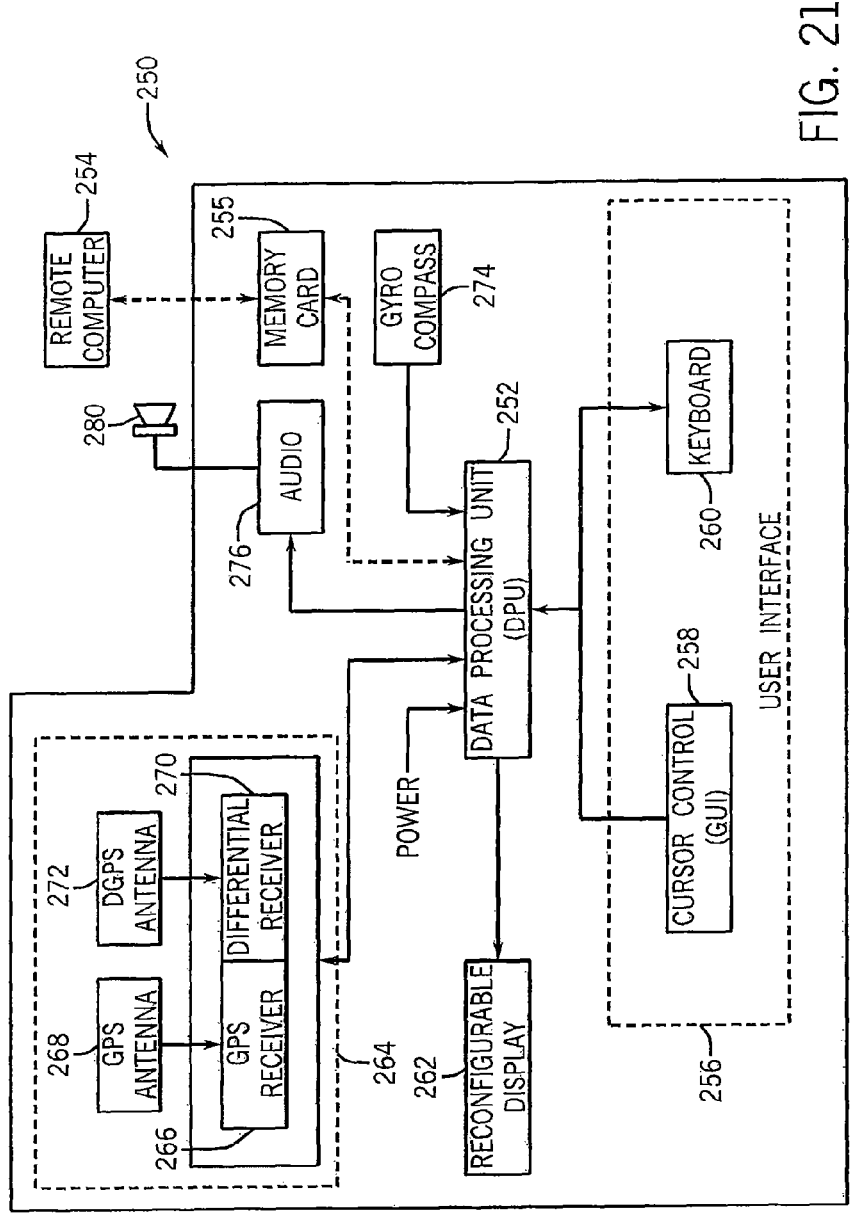

METHOD AND APPARATUS FOR SIGNALING TO AN OPERATOR OF A FARM IMPLEMENT THAT THE FARM IMPLEMENT IS TRAVERSING A SEEDED AREA

BACKGROUND OF THE INVENTION

The present invention relates to farm implements and, more particularly, to a method and apparatus for notifying the operator of a farm implement during an active seeding exercise that the farm implement is traversing a previously seeded area of a farm field.

Seed, fertilizer, inoculants, and the like are typically applied to a farm field, or other planning surface, using an air seeders or similar agricultural implement. A conventional air seeder includes an air cart that includes one or more hoppers and metering devices to hold particulate material and meter the particulate material from the hoppers for subsequent delivery to an air hoe drill or similar device for ultimate application on the farm field by row units.

To keep pace with the increasing in field sizes, air seeder manufactures have designed and made air seeders having larger hoppers and air hoe drills with greater field coverage, i.e., more row units. While larger air seeders with greater field coverage in a single pass, the larger equipment proves to be difficult when attempting to seed/fertilize a smaller piece of land within a larger piece of land, or a piece of land with an irregular shape. As a result, the cost expended on seed and fertilizer is in excess of what is necessary for proper seeding and fertilizing. Additionally, over-fertilization and/or over-seeding of an area causes the crop to lodge and not ripen at the appropriate time causing harvest problems and losses in yield. The accumulative effect of the seeding and fertilizing overlap in small sections over many fields can become a very significant expense to a farmer.

Prior art implements have sought to remedy this situation by implementing a metering device in the seeder than can apply a specific quantity of seed per linear distance. However, the prior art has not resolved the problem that double seeding can occur when the land seeded is too narrow or odd shaped for the seeding device. Further, the prior art has not resolved the problem that even though the meter has been turned off, ground-engaging openers are still engaging the ground and destroying the seed bed. This causes the seeded area which is overlapped to be destroyed by the ground-engaging openers resulting in uneven germination causing further problems with a poor crop and an uneven harvest in these areas.

Canadian Patent 2,503,174 provides for a multi-compartment air seeding system where each compartment is assigned to a selected air stream based on the volume or type of seed and fertilizer required for a specific crop. A metering assembly is provided which comprises a metering house 80 for receiving the seed or fertilizer material as well as a metering roller for metering the material. Metering cells then collect the material for seeding. Diverter plates are also provided to move front and backwards to open and close the tops of either the front and rear material cells.

U.S. Pat. No. 5,980,163 further provides a distribution manifold for an air seeder for dispensing product. Further, it provides by-pass ports and venturi ports, with the venturi ports making up the row of ports in which product from the product tank associated with the primary distribution manifold is to be deposited. The by-pass ports make up the remainder of rows in the primary distribution manifold. If the venturi ports do not make up the top row of ports in the primary distribution manifold, product from the associated product tank flows through rows of by-pass ports until the product encounters a row of venturi ports. Following entering into the venturi ports, product is carried by the pneumatic distribution system to the tillage. This device promotes a smooth flow of metered product as well as allowing the operator to adapt the pneumatic distribution system for varying configurations.

Although both of the above prior art devices disclose air seeders that allow for metered seeding or fertilizing, neither of the above devices disclose a device that is both able to selectively obstruct a portion of the meter, as well as lift the corresponding ground-engaging openers, thus, preventing double seeding and the destruction of the seed bed.

U.S. Pat. No. 7,690,440 discloses an apparatus that purports to overcome the drawbacks of the prior art described in the aforementioned Canadian patent and U.S. Pat. No. 5,980, 163. Specifically, U.S. Pat. No. 7,690,440 describes an agricultural seeder or fertilizer having a meter device which dispenses seed or fertilizer to a plurality of ground-engaging members. The supply of metered seed or fertilizer to each of the ground-engaging members is controlled via input from a GPS/GNSS satellite navigation system to prevent the meter device delivering seed or fertilizer to selected of the ground-engaging members which would otherwise pass over soil which has been previously seeded or fertilized. Raising means, responsive to input from said GPS/GNSS satellite navigation system detecting that the device is travelling or is about to travel over areas of soil that has been previously seeded or fertilized, is further provided to raise the selected ground-engaging members to which delivery of seed/fertilizer has been prevented in order to prevent soil which has been previously seeded or fertilized from being disturbed.

While effective in preventing double seeding, the system described in the U.S. Pat. No. 7,690,440 and similar automated systems remove control of the seed metering system and raising/lowering of the ground-engaging members from the implement operator when the automated system determines, based on inputs received from the GPS/GNSS satellite navigation system, that the implement is traversing previously seeded land. While an automated system provides surety against double seeding or engaging a disc opener with seeded land, some operators may prefer that the metering system and/or tool bar to which the disc openers are mounted not be automatically controlled.

Consequently, there is a need for a system that notifies an operator of an implement that the implement, or parts thereof, is crossing in or out of already seeded or fertilized zones, which allows the operator to smartly, but manually control the seed metering system and/or tool bar to prevent repetitive seeding and/or fertilizing as well as prevent disturbing previously seeded/fertilized land.

SUMMARY OF THE INVENTION

The present invention provides an operator notification and warning system that signals to an implement operator when the implement, or portions thereof, are passing over previously seeded or fertilized land. The invention allows the operator to manually initiate sectional control the implement's seeding system and/or control the implement's tool bar so that previously seeded or fertilized land is not disturbed. The invention is believed to be preferred by operators who prefer manual as opposed to automated control of the implement's sectional control systems. Additionally, it is believed that the present invention is less complex, and thus less costly, than fully automated systems.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 21 is a schematic view of sectional control apparatus according to another embodiment of the present invention.

DETAILED DESCRIPTION

Figure 1:
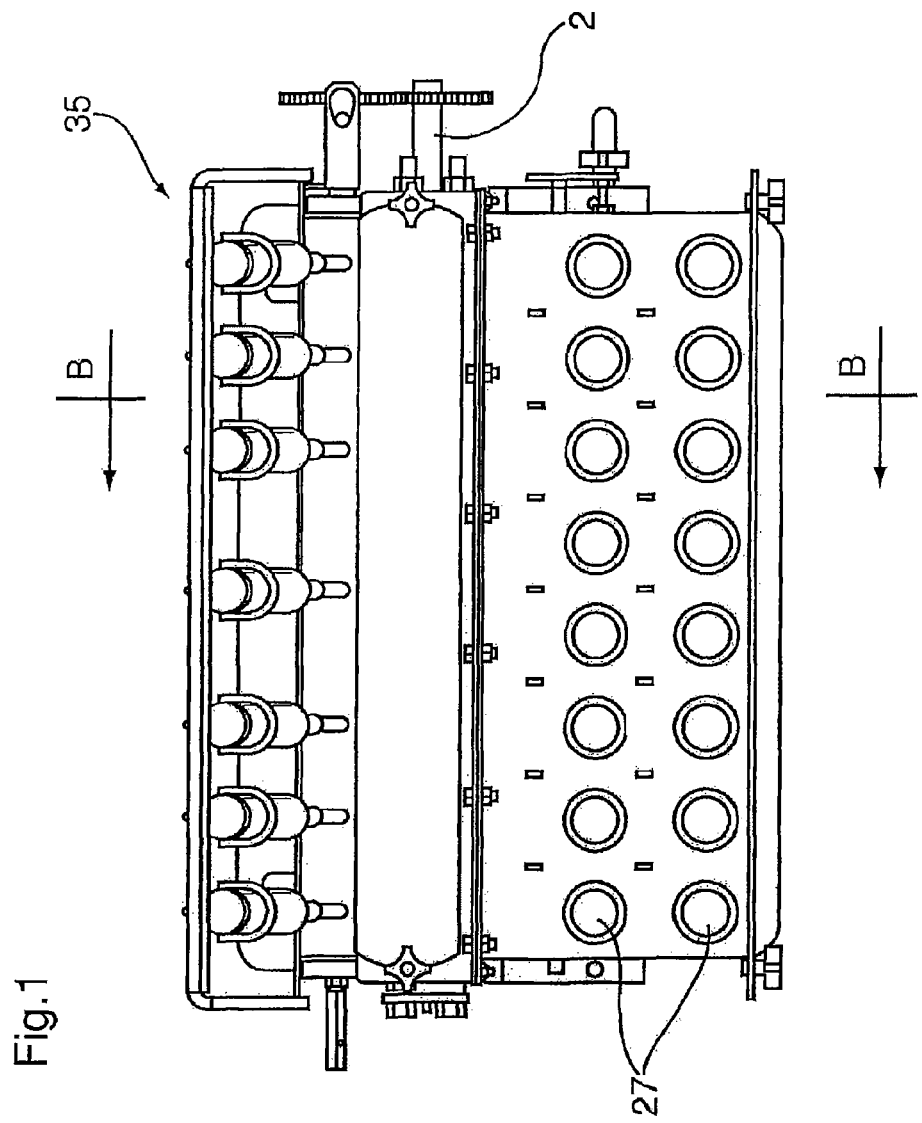
FIG. 1 is a front view of a meter shut-off apparatus as per one embodiment of the present invention.

The present invention, both as to its organization and manner of operation, may best be understood by reference to the following description and the drawings wherein numbers are used throughout several views to label like parts. Certain parts which are mentioned may be absent in particular figures due to the view of the drawing or obstruction by other parts. FIGS. 1-20 are several views of a meter shut-off apparatus in which GPS/GNSS technology is used to automatically control operation of the meter shut-off apparatus to avoid "double-application" of seed, fertilizer, herbicide, micronutrients, and the like. As will be apparent from the following description, the present invention can be implemented with an apparatus similar to that shown in FIGS. 1-20 or described in U.S. Pat. No. 7,690,440, the disclosure of which is incorporated herein, or with other known or to be developed GPS/GNSS-based sectional control systems.

One embodiment of a sectional meter shut-off device/assembly 35 is illustrated in FIGS. 1 to 8. The sectional meter shut-off device is comprised of a fluted or toothed metering roller 1 for ultimate distribution of particulate material, such as seed, to an agricultural implement. The metering roller 1 extends across the width of a metering assembly 35. The metering roller 1 can be made of a variety of materials and have a variety of fluted or toothed configurations to correspond to the various crops that may need seeding. Hereinafter "seed" shall include any granular or particulate matter such as crop seed, fertilizer, micronutrients, herbicide, pesticide and the like, and "seeding" shall include the application of any granular or particulate material and is thus not limited to the application of crop seed into a seed bed. Upon forward movement of an air seeding system 100 the metering roller 1 rotates on a drive shaft 2 which causes particulate material including seed and fertilizer to be dispensed from a supply source 5 having a seed tank 96 and a fertilizer tank 98 to dispense at a predetermined rate through outlets 27 in the fertilizer metering assembly 35a or seed metering assembly 35b and into distribution lines 37 (see FIG. 8) and ultimately dispensed by an air distribution system 15, 18 through a plurality of ground-engaging openers 3 (FIGS. 13 to 16) and into soil. FIGS. 1-7 illustrate outlets 27. In a field where a pie shape or long strips of land remain unseeded or unfertilized and/or are narrower than the width of the seeding/fertilizing machinery, it would be optimal to turn off part of the seeding/fertilizing machinery to only seed/fertilize those areas that have not been seeded/fertilized rather than over-seed/fertilize or double-seed/fertilize a particular area and disturb an underlying seed bed. To accomplish this, a plurality of gates 4 are installed above the metering roller 1 which are able to move in either forward or rearward directions. In the forward direction each gate 4 prevents particulate material from being dispensed to that particular section of the metering roller 1 and acts as a barrier preventing the particulate material from contacting the metering roller 1. In the rearward position the gate 4 allows the particulate material to access the metering roller 1. A plurality of these gates 4 occur along the axis 33 of the metering roller 1 such that the metering roller 1 can be divided into sections and individual gates 4 can be engaged to provide a different length of the air seeding system to be blocked for seeding or fertilizing purposes. It is contemplated that other types of flow-prevention devices other than, or in addition to gates, may be used to selectively stop the flow of seed to selected portions of the metering roller.

Figure 2:
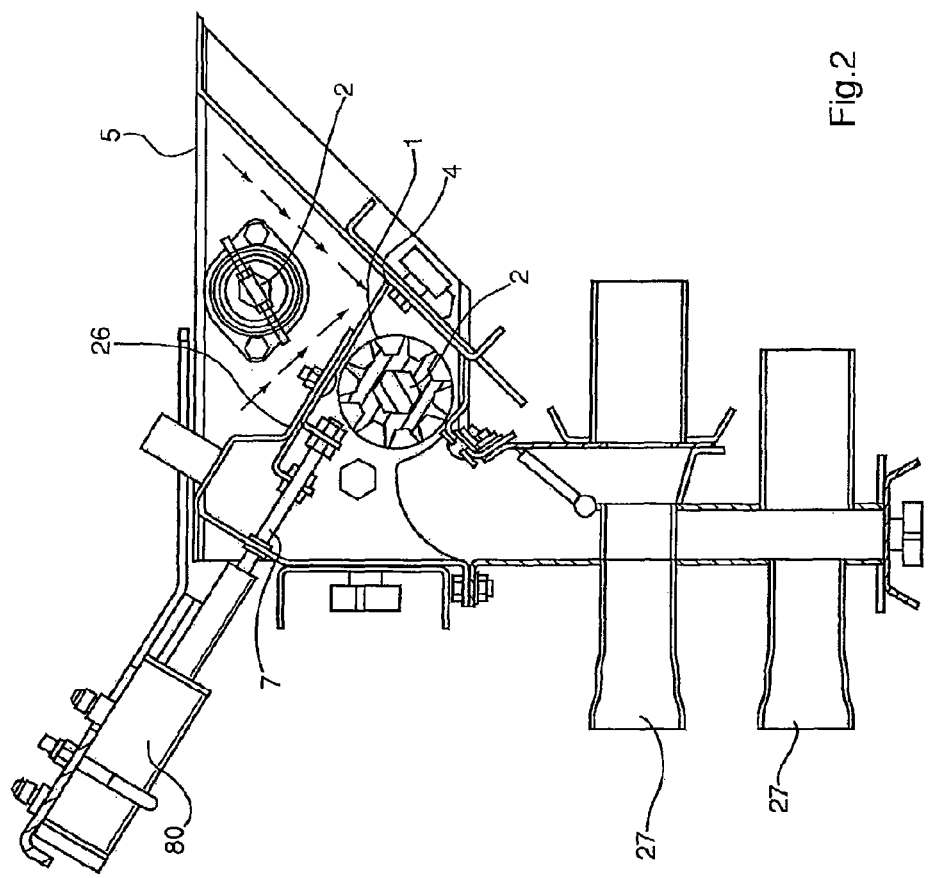
FIG. 2 is an enlarged cross-sectional view of the meter shut-off apparatus of FIG. 1, taken along line B-B of FIG. 1, showing the shut-off gates in the closed position.
Figure 3:
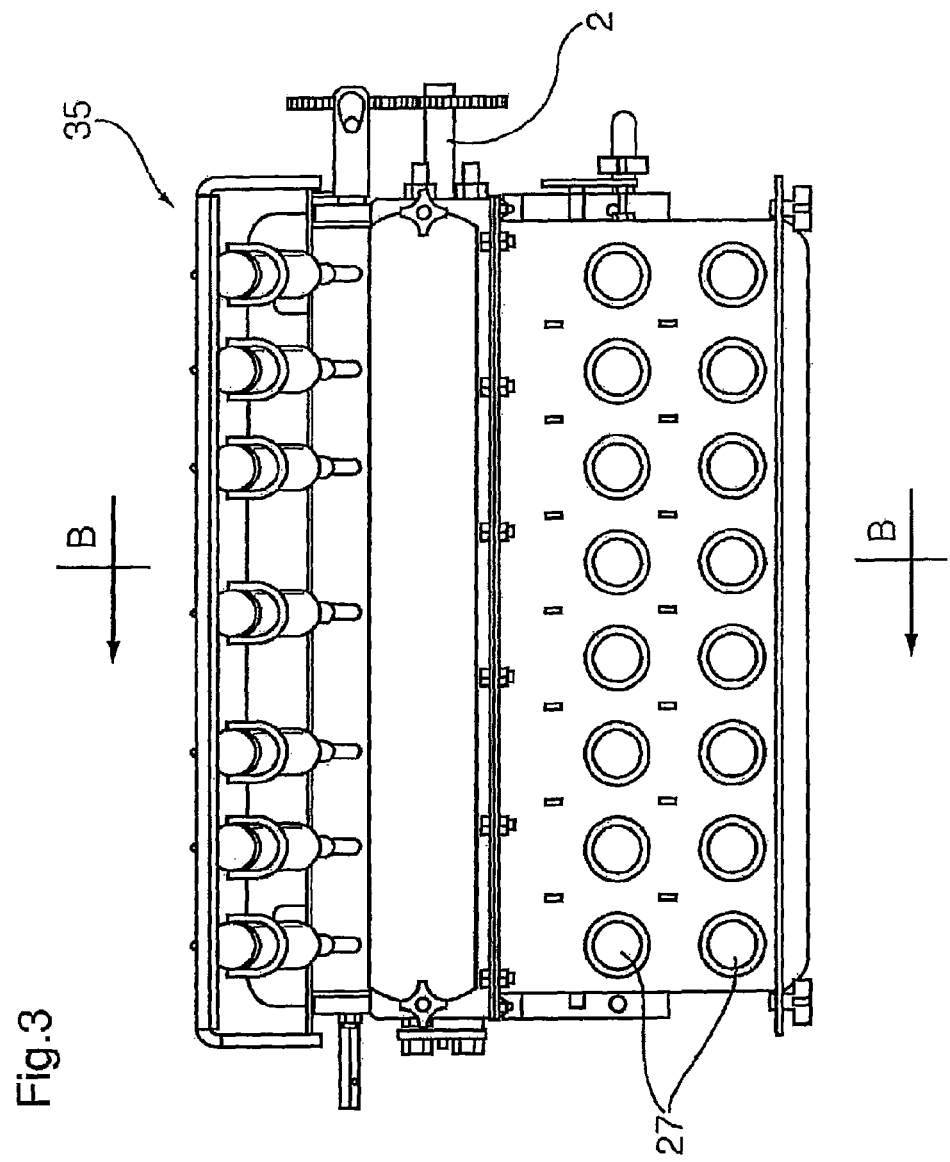
FIG. 3 is a front view of a meter shut-off apparatus of the present invention, similar to FIG. 1.
Figure 4:
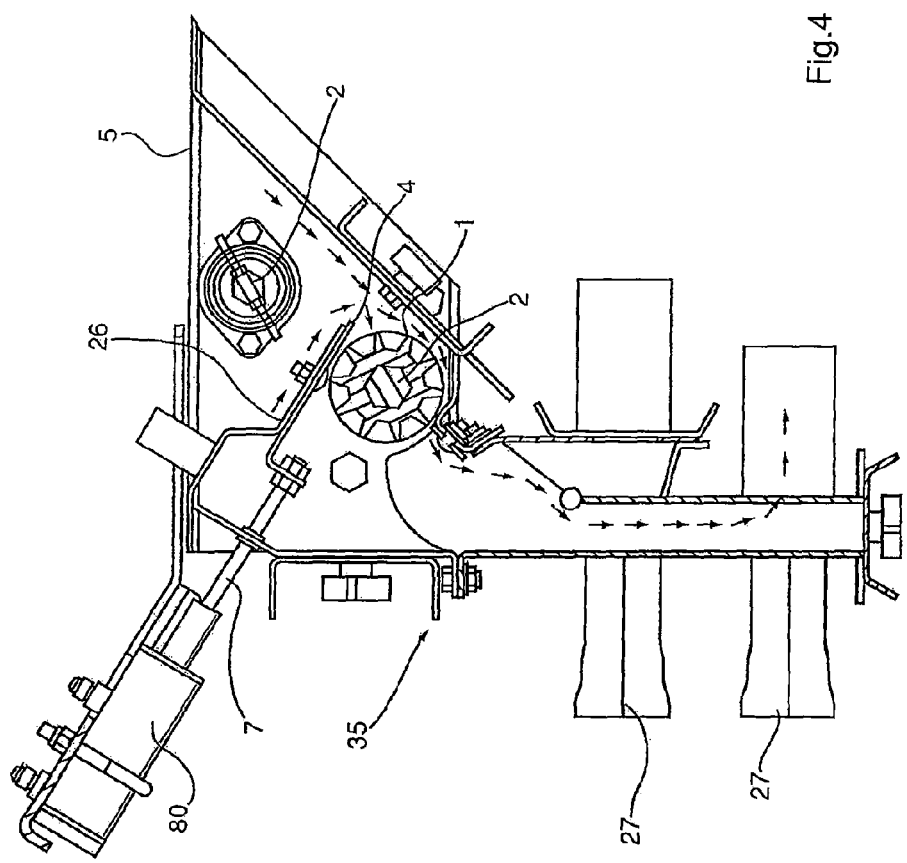
FIG. 4 is an enlarged cross-sectional view of the meter shut-off apparatus of FIG. 3, taken along line B-B thereof, showing the shut-off gates in the open position.

As seen in FIGS. 2 and 4, a gate 4 is threadably connected to a first end of a shaft 7 above the metering roller 1. The shaft 7 is slidably attached to the internal surface of the rear and upper corner of an air seeding system hopper 5. Further, a second end of the shaft 7 is attached to an electric actuator, a hydraulic cylinder actuator, or an electric over hydraulic meter gate actuator 80. Further, each gate 4 is slidably connected to a metal plate 26, the plate 26 being connected to the upper, rear portion of an air seeding system hopper 5 by a variety of means which may include but are not limited to welded, soldered or bolted. The metal plate 26 serves as a guide for the gate 4 such that the plate's position relative to the gate 4 correctly positions the gate 4 over the metering roller 1 when engaged by the shaft 7. Further, when engaged by the shaft 7, the gate 4 is brought forward to engage the opposite end of the air seeding system hopper 5 such that particulate material cannot pass between the gate and the air seeding system hopper 5. When not engaged by the shaft 7, the gate 4 remains in a fixed position slidably attached to the metal plate 26. In this position, particulates can pass between the gate 4 and the air seeding system hopper 5 and through to the metering roller 1 and then to distribution lines 37. From the distribution lines 37, the particulate material will ultimately pass to the ground-engaging openers 3 of an agricultural implement/air seeding apparatus 200 and into the soil.

Figure 5:
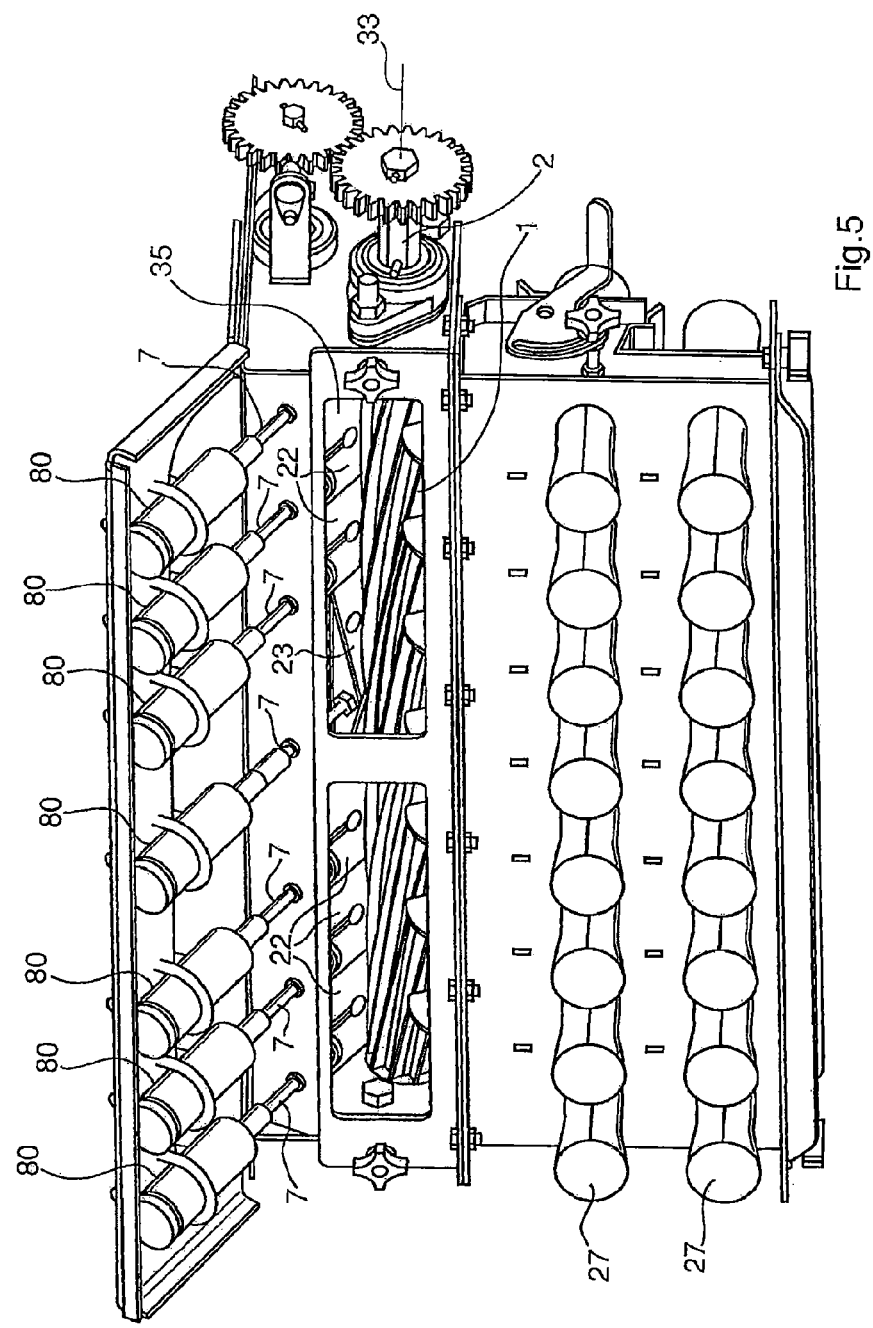
FIG. 5 is a bottom perspective view of the meter shut-off apparatus of the present invention, including the individual shut-off gates in both open and closed positions.
Figure 6:
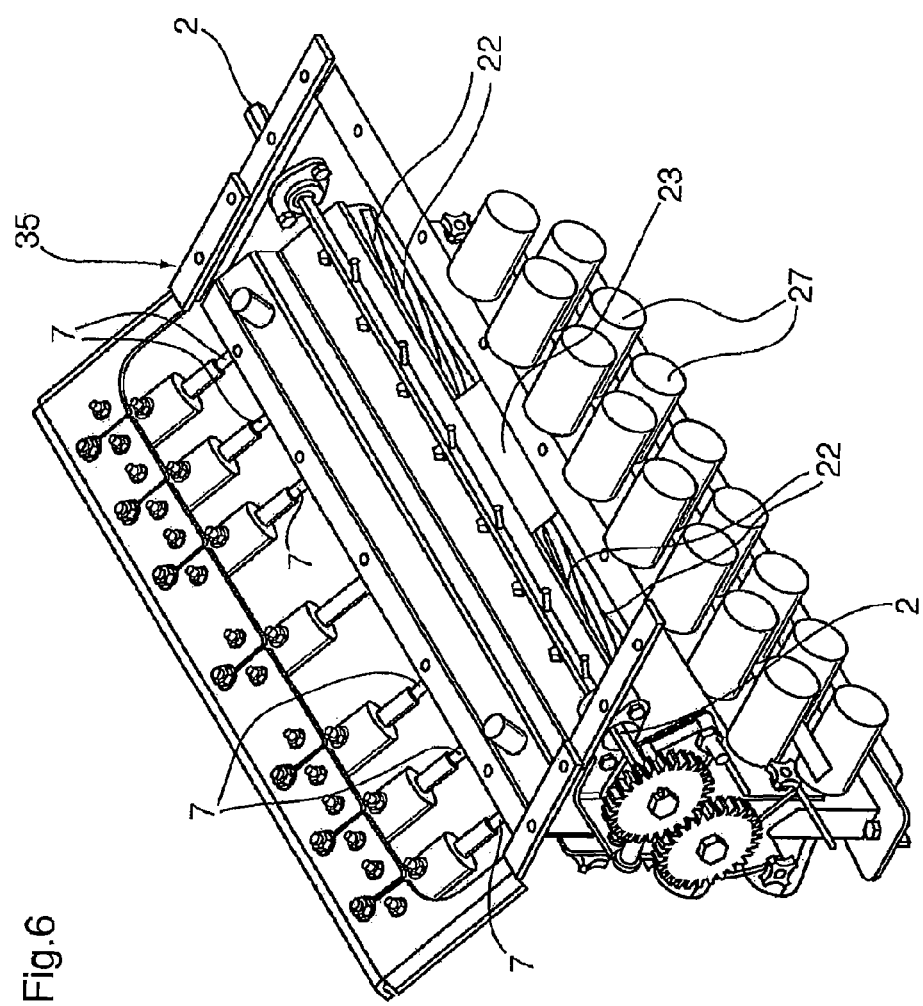
FIG. 6 is a top perspective view of the meter shut-off apparatus of the present invention, including the individual shut-off gates in both open and closed positions.
Figure 7:
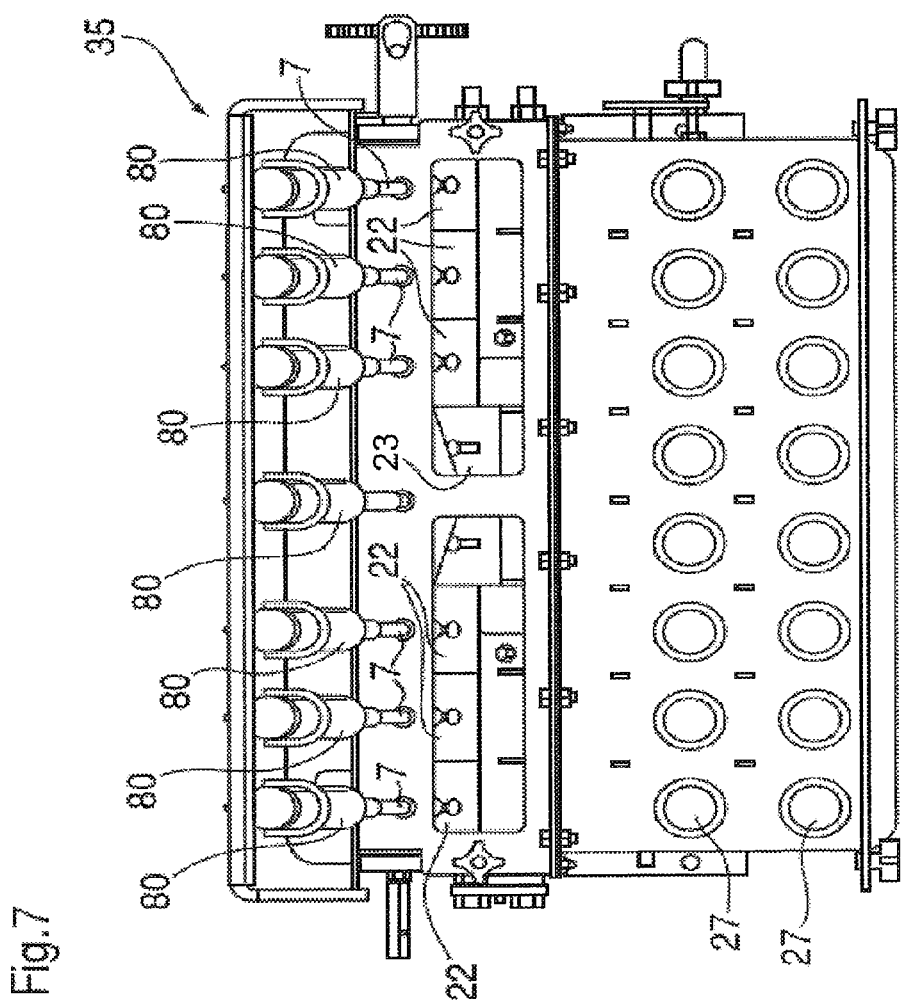
FIG. 7 is a front view of the meter shut-off apparatus of the present invention, showing gates in both opened and closed positions.
Figure 8:
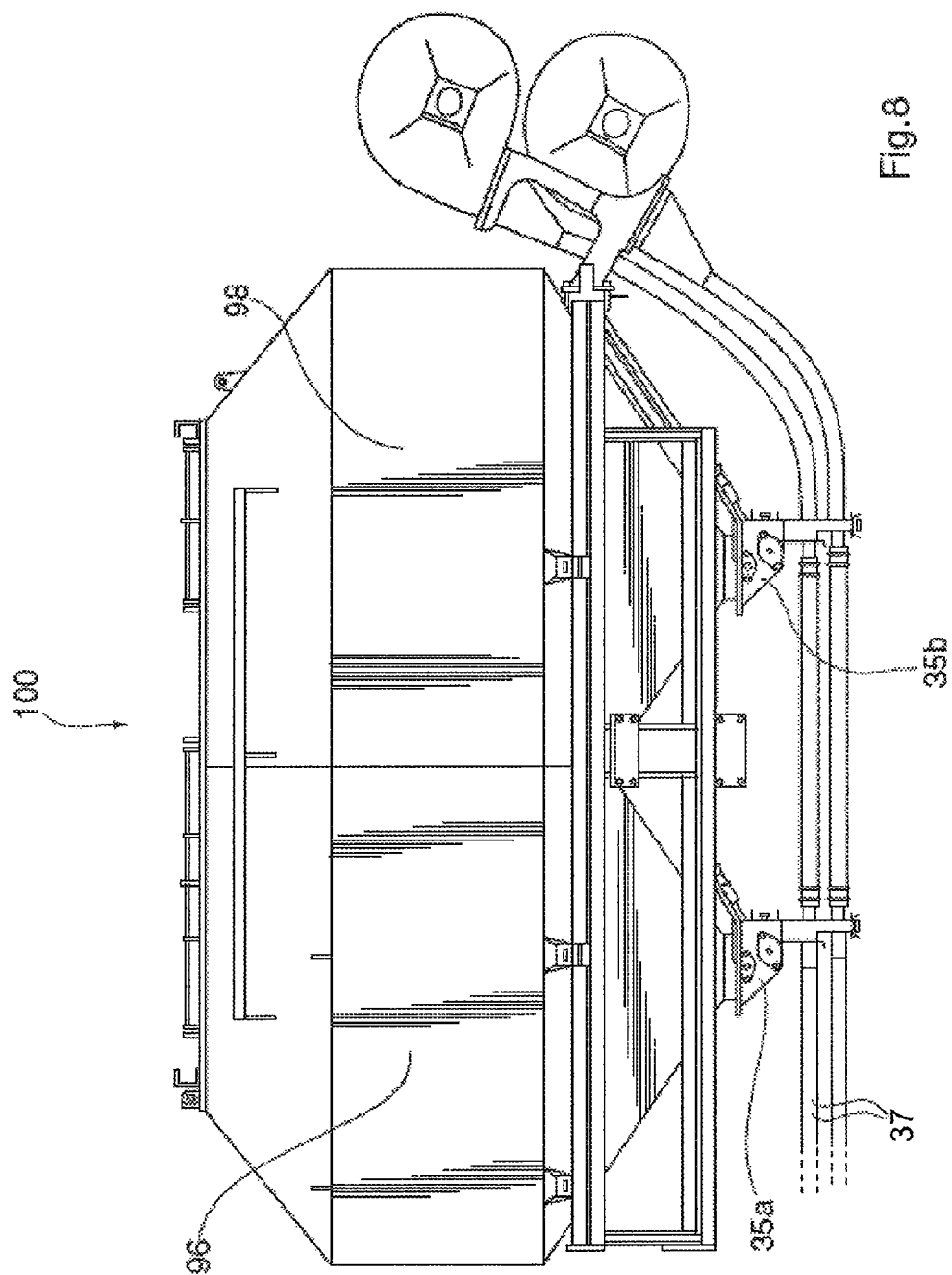
FIG. 8 is a side view of the air seeding apparatus of the present invention which supports a fertilizer tank and a seed tank showing the location of installation of the meter shut-off apparatus.

FIGS. 5 to 7 show the shaft 7 differently engaged to produce an open gate 22 or a closed gate 23 when activated. Each gate 4 is ideally made of steel or another suitably strong metal. When in the forward (closed) position, the gate 23 completely prevents the metering roller 1 from accessing any particulate matter released from above the metering roller 1. In FIG. 2 the gate 4 can be clearly seen in its closed position 23 blocking all access of the particulate material to the metering roller 1. In FIG. 4 and FIG. 6 the opened gates 22 can best be seen in which a free flow of particulate matter to the metering roller 1 can occur.

Figure 17:
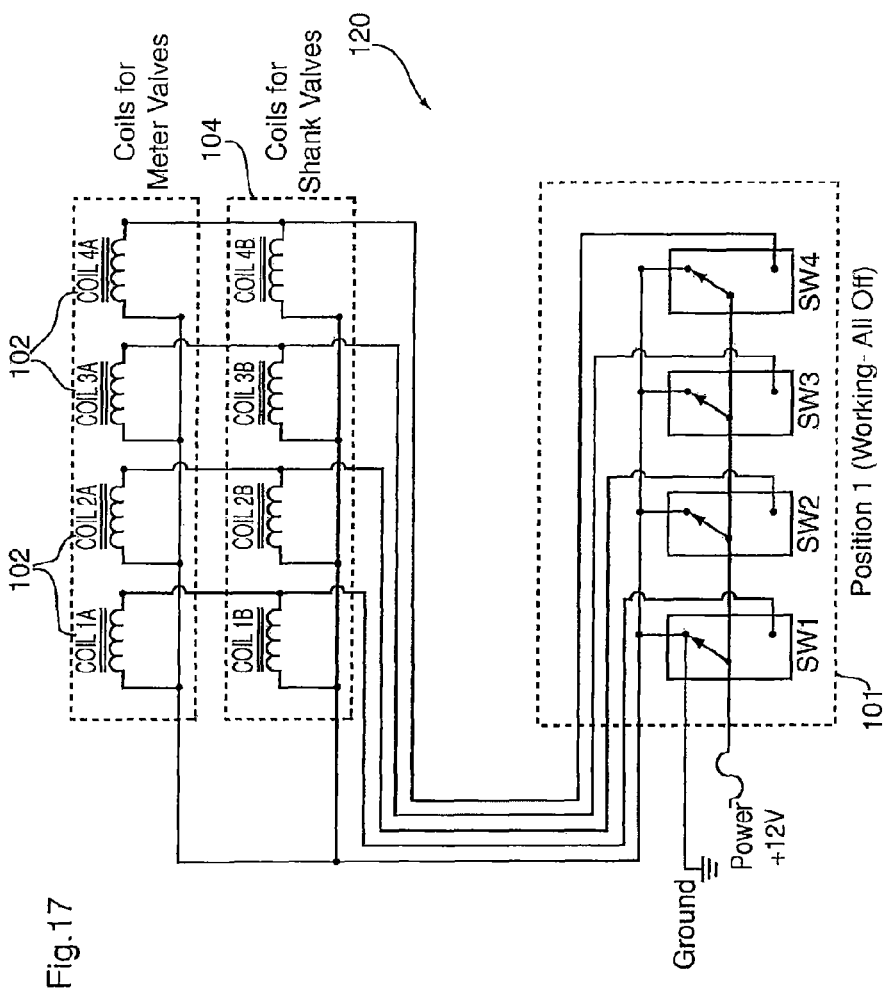
FIG. 17 is a schematic of an electrical circuit for operating the air seeding device of the present invention, showing all switches in the off position.

An electric switch 101 in the cab of the vehicle (not shown) pulling the air seeding apparatus 200 is connected operatively to an electric actuator, hydraulic actuator or electric over hydraulic actuator 80 which is operatively connected to the second end of the shaft 7 to allow the operator to operate the sectional meter shut-off apparatus 35 and more specifically designate which gates 4 are to be open and which gates 4 are to be closed based on the operators knowledge of which soil is to be seeded/fertilized and which is to remain undisturbed. FIG. 17 shows a schematic of the electrical circuit 120 for operating the air seeding apparatus 200 of the present invention, which includes a plurality of switches 101, for operating corresponding electrical coils 102 which respectively operate corresponding hydraulic valves 202 to control hydraulic cylinder actuator 80 and thus gates 4 on meter shut-off device 35 (see FIG. 19), and such switches 101 further operate coils 104, which correspondingly control hydraulic valves 112 for controlling hydraulic cylinders 12 for raising and lowering respective opener arm assemblies 202 from engagement with soil.

Figure 18:
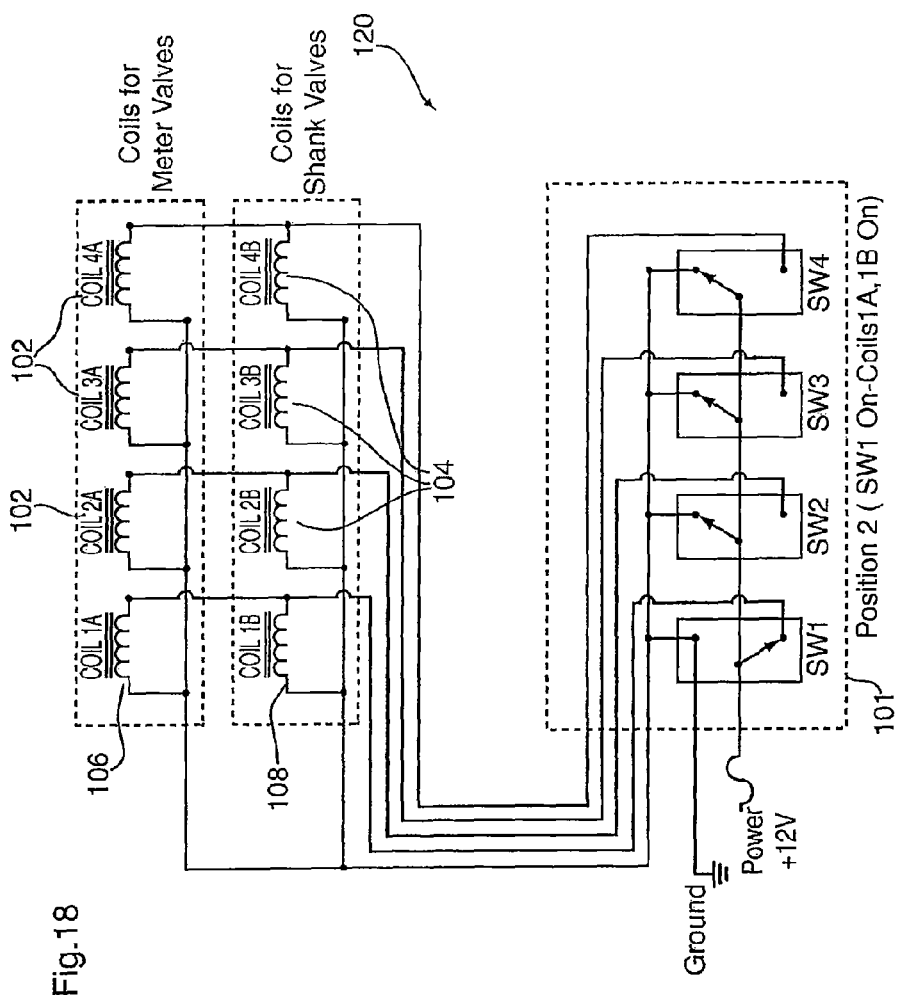
FIG. 18 is a schematic of the electrical circuit of the meter shut-off device of the present invention, showing switch 1 in the on position.
Figure 19:
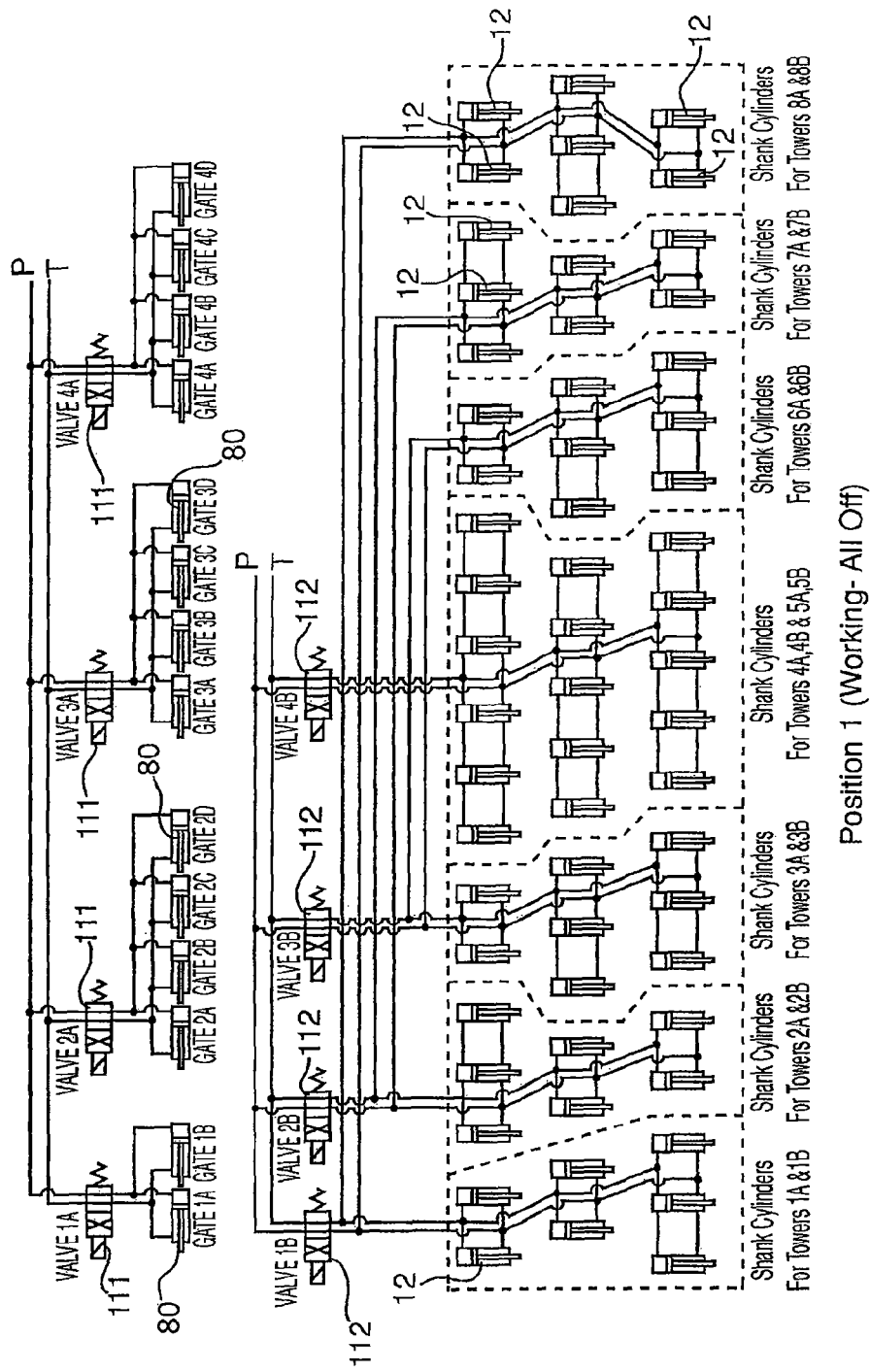
FIG. 19 is a schematic of a hydraulic circuit for operating the meter shut-off device of the present invention, showing all valves in the "off" position.

FIG. 18 is an electrical schematic similar to FIG. 17, both figures showing an electrical circuit 120 for operating air seeding apparatus 200, which includes a plurality of switches 101 for operating corresponding electrical coils 102. Electrical coils 102 respectively operate corresponding hydraulic valves 111 to control gates 4 on meter shut-off device 35 (see FIGS. 19 & 20).

Switches 101 of FIGS. 17 & 18 further and simultaneously operate coils 104 which correspondingly control hydraulic valves 112 for controlling hydraulic cylinders 12 for raising and lowering respective opener arm assemblies 202 from engagement with soil.

Figure 20:
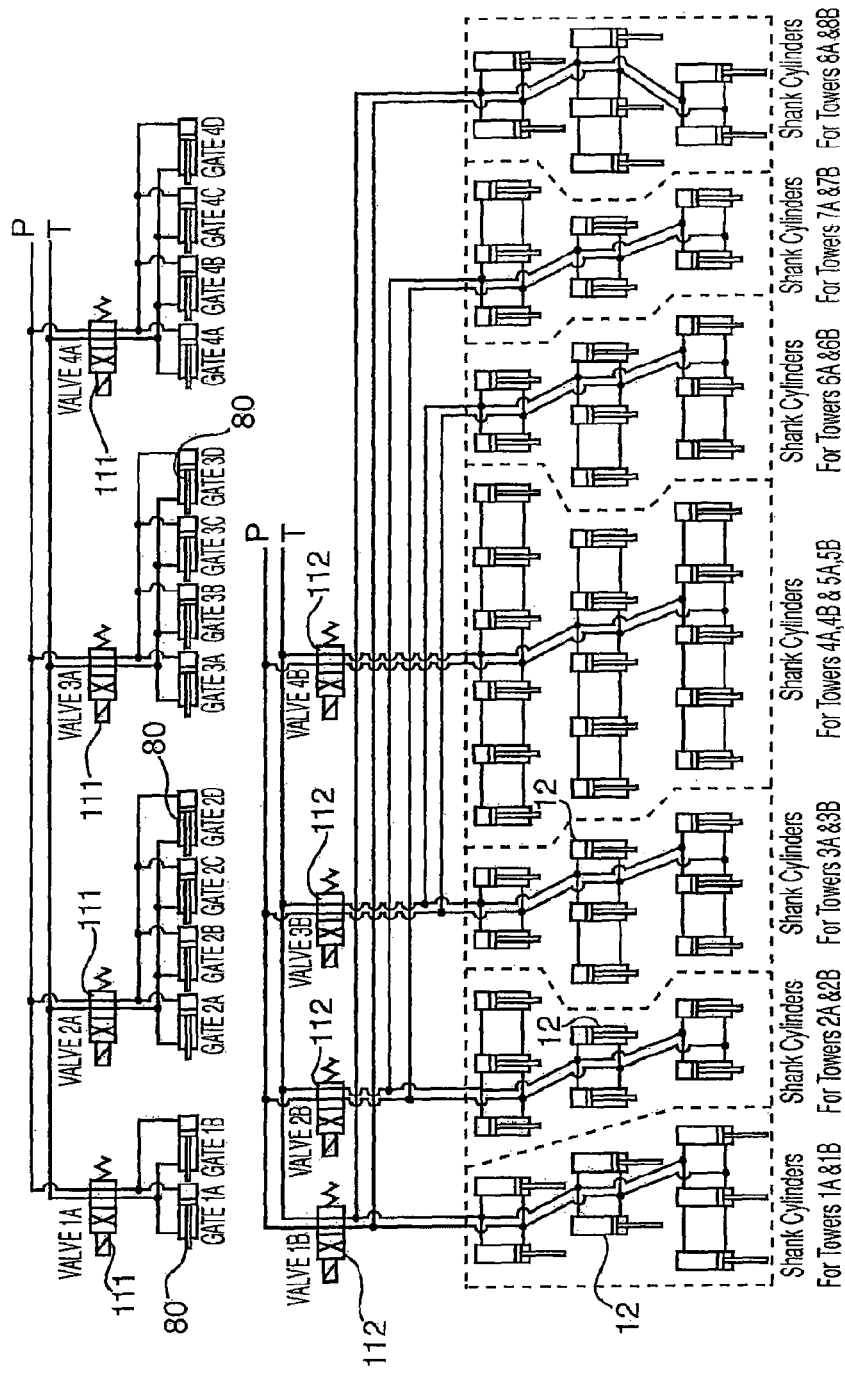
FIG. 20 is a schematic of a hydraulic circuit for the meter shut-off device of the present invention, showing valves 1A and 1B in the "on" position and remaining valves in the "off" position.

In this regard, FIG. 20 shows shank hydraulic cylinders 12 for groups of opener arm assemblies 202 (see "towers" 1A & 1B) in actuated position so as to cause associated opener assemblies 202 to be in the raised position. Remaining hydraulic cylinders 12 for remaining shank towers 2A, 3A, 4A, 5A, 6A, 7A & 8A, and 2B, 3B, 4B, 5B, 6B, 7B, and 8B are shown in the position to effect lowering of associated opener arm assemblies 202.

In the electrical circuit 120 shown in FIG. 17, all switches 101 (eg. sw1-4) are shown in the "off" position. This causes associated hydraulic valves 112 to open and thereby cause corresponding hydraulic actuators 80 which control the metering gates 4 of the meter shut-off devices 35a, 35b to actuate the gates 4 to be in the "closed" position, and correspondingly control hydraulic valves 112 to cause hydraulic cylinders 12 to lower the opener arm assemblies 202 to engage soil (See FIG. 19, and FIG. 16).

Figure 15:
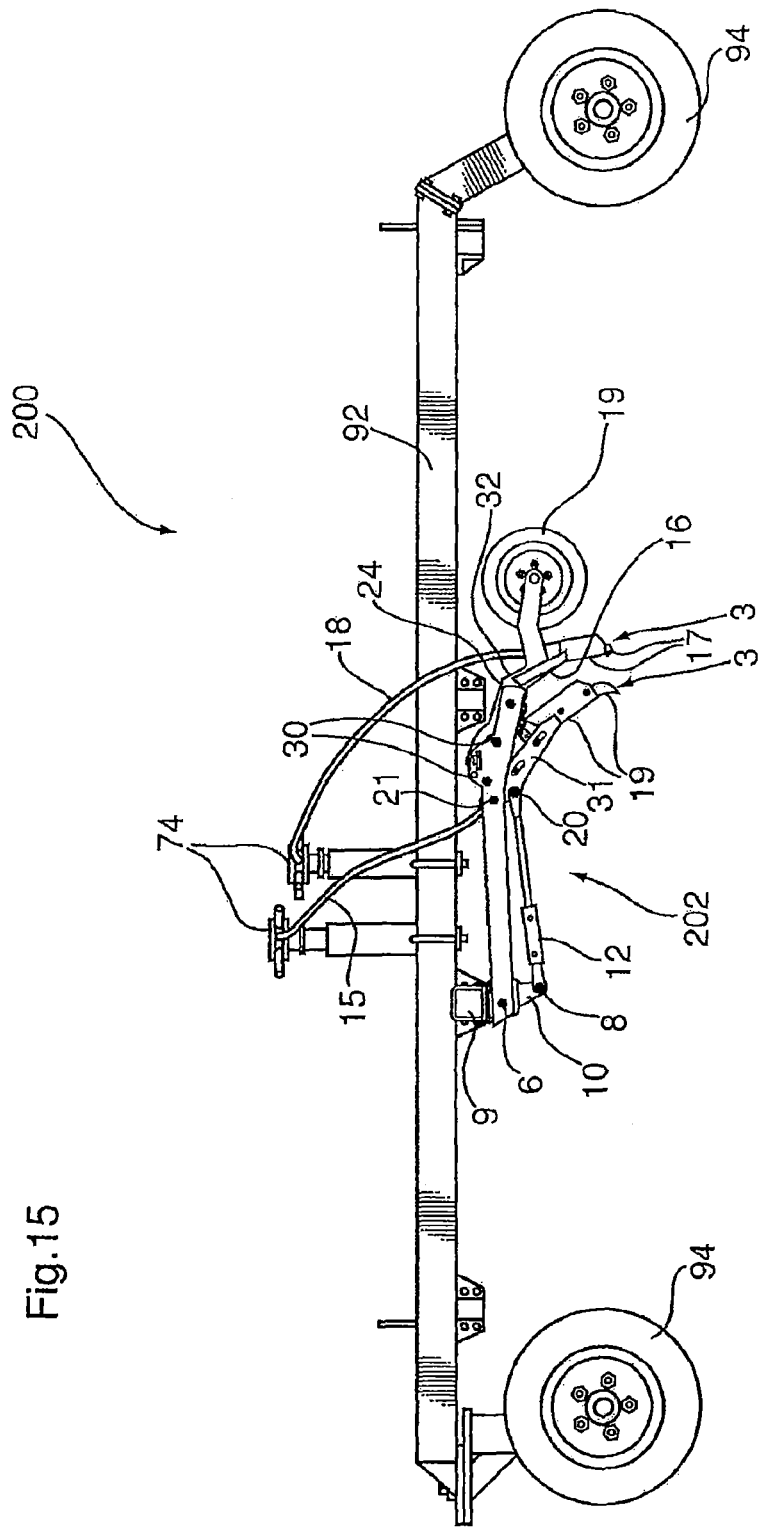
FIG. 15 is a cross-sectional side view of the agricultural implement of the present invention, with the soil openers in the raised position and pivotally mounted to a conventional frame.

In the electrical circuit 120 shown in FIG. 18, sw1 is shown in the "on" position and the remaining switches sw 2-4 are shown in the "off" position. As seen from FIGS. 18 and 20, due to sw1 being in the "on" position, corresponding coil 102 (coil 1A) activates meter shut-off valve 111 which correspondingly activates meter gate hydraulic actuator 80, so as to close meter gate 4. Simultaneously, switch 101 (sw) activates coil 108 (coil 1B), so as to activate hydraulic valves 112 (see FIG. 20) (valve 1B), which in turn operates hydraulic shank cylinders 12 for opener arm assembly 202 (shank cylinders 1A, 1B), so as to cause hydraulic shank cylinders 12 to raise opener arm assembly 202 to the raised position, as shown in FIG. 15 and in position 91 on FIG. 12.

Figure 9:
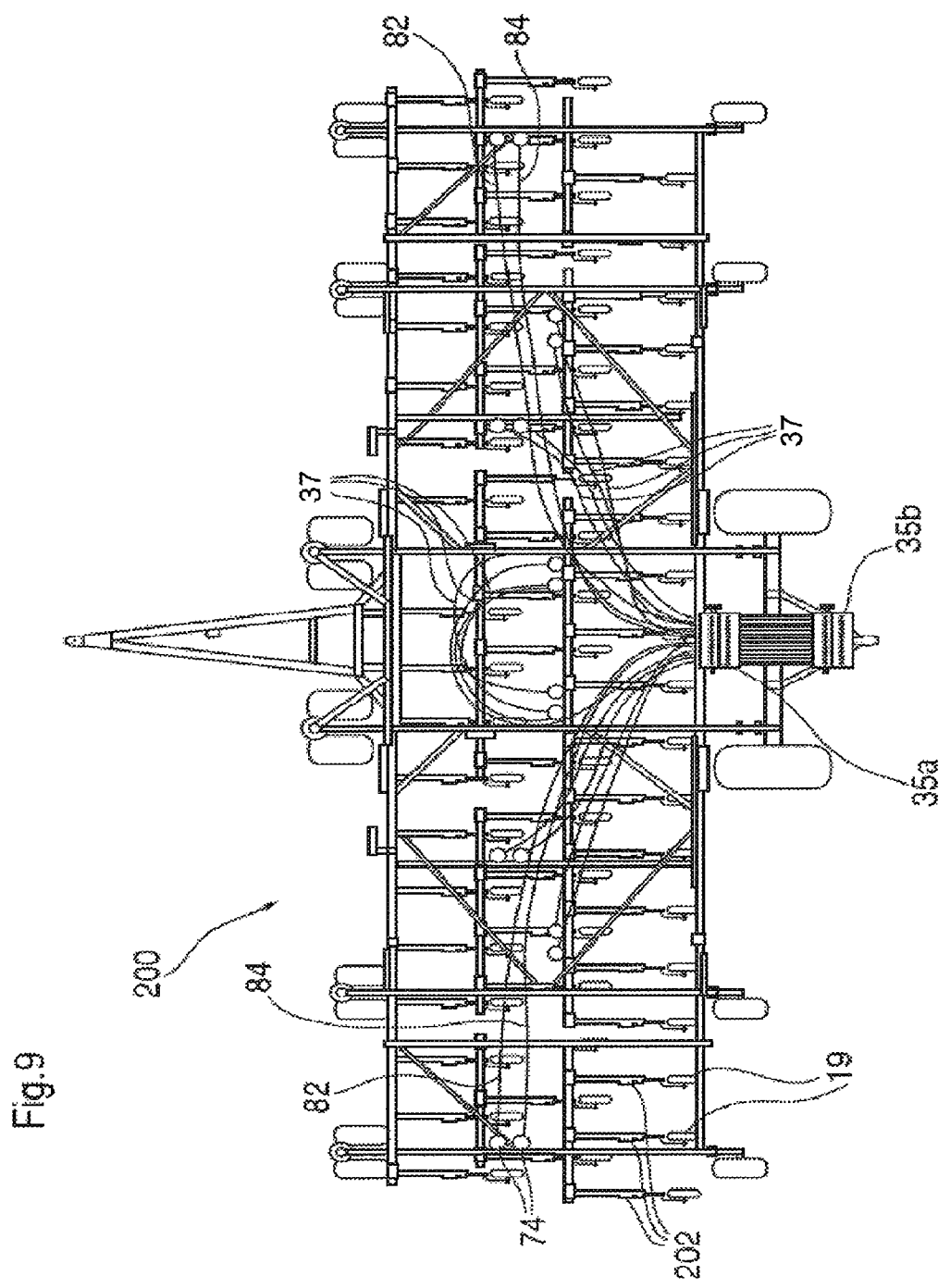
FIG. 9 is a top plan view of an air seeding apparatus of the present invention depicting distribution lines that are open to the flow of fertilizer from the meter shut-off apparatus.
Figure 10:
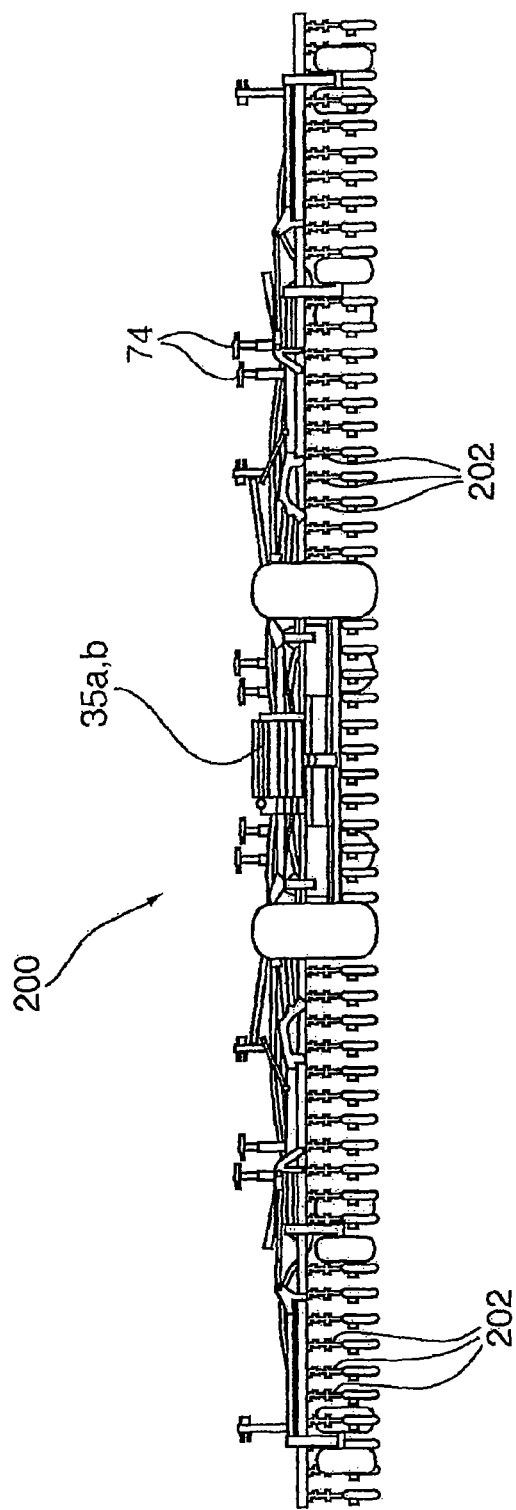
FIG. 10 is a front view of an air seeding apparatus of the present invention depicting the soil openers in the lowered position.

FIGS. 8 to 12 shows an agricultural apparatus equipped with a seed meter 35a and a fertilizer meter 35b. From each meter 35a, 35b, a plurality of distribution lines 37 are coupled such that an individual gate 4 within a meter 35a, 35b will correspond to an individual distribution line 37. Each distribution line is also coupled at its other end to a secondary distribution head 74. Each agricultural apparatus 200 has a plurality of secondary distribution heads 74. Each secondary distribution head 74 has a plurality of couplings to seed hoses 82 or fertilizer hoses 84. Each secondary distribution head 74 is then coupled at its other end to respective seed tube/hose 18 and fertilizer hose/tube 15 (see FIG. 9). Because the secondary distribution head 74 has a plurality of couplings to seed tube/hoses 18 or fertilizer tube/hoses 15, each gate 4 of meter shut-off 35a, b can selectively open or close the supply of seed or fertilizer to a respective plurality of seed hoses 18 (in the case of a seed meter shut-off device 35a) and to a plurality of fertilizer tube/hoses 15 (in the case of a fertilizer meter shut-off 35b). In FIG. 9 all of the distribution lines (white) depict seed and fertilizer hoses 82, 84 respectively open to the flow of fertilizer by a plurality of gates 4 in the seed meter 35a, and fertilizer meter 35b, respectively. Accordingly, in FIG. 10, all of the agricultural implements 200 are in the lowered position to allow the soil to be fertilized.

Figure 11:
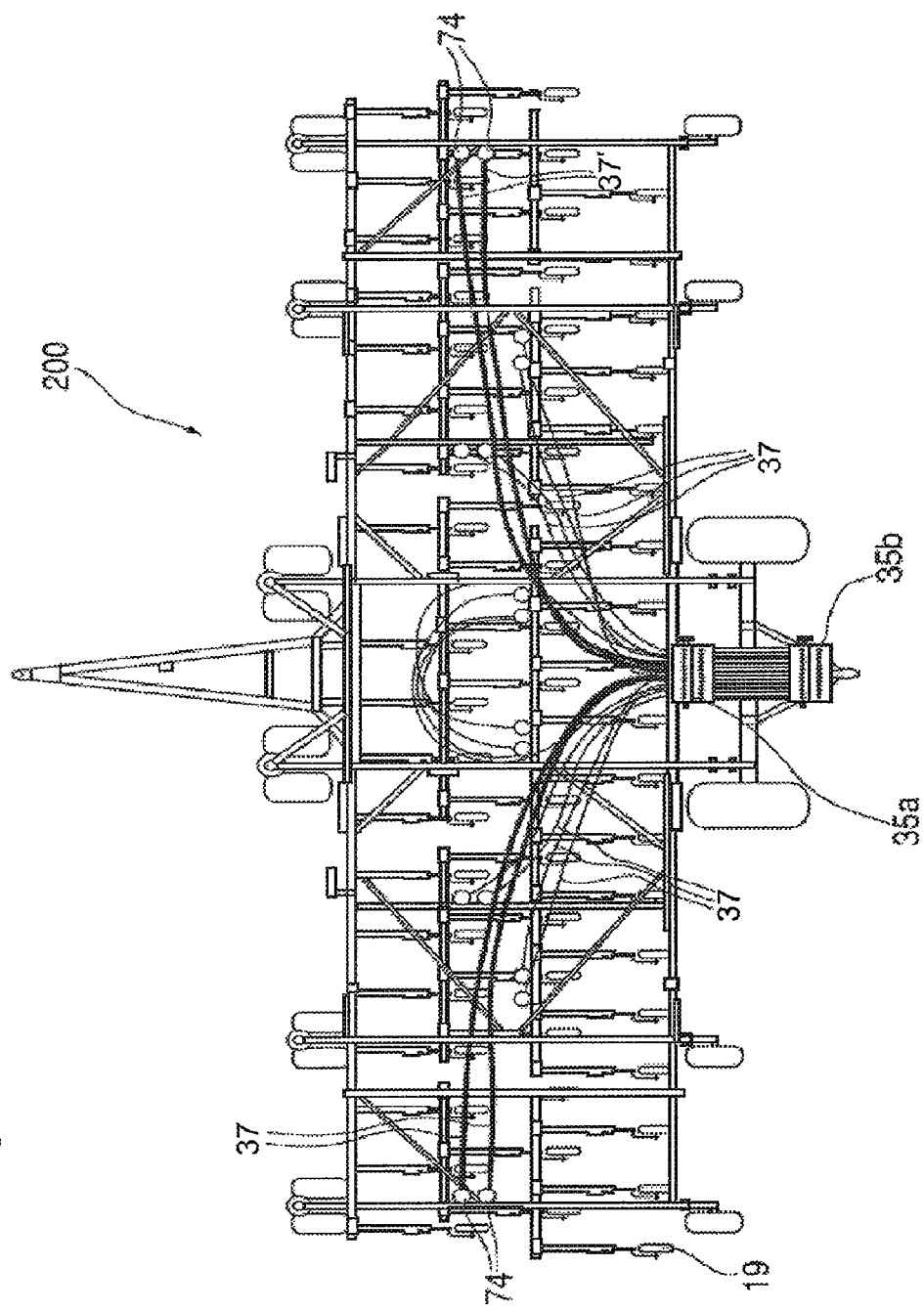
FIG. 11 is a top plan view of an air seeding apparatus of the present invention, depicting distribution lines that are either open (white) or shut-off (black) to the flow of fertilizer and seed from the meter shut-off device.

The black distribution lines in FIG. 11 depict seed hoses 82 and fertilizer hoses 84 shut-off to the flow of fertilizer by a plurality of gates 4 in the respective meter 35a,b, and the white distribution lines depict seed hoses 82 and fertilizer hoses 84 open to the flow of seed and fertilizer by a plurality of gates 4 in the respective seed and fertilizer meters 35a, b. As such, a plurality of opener arm assemblies 202 will have seed and fertilizer distributed to them and a plurality of opener arm assemblies 202 will not have fertilizer or seed distributed to them.

Figure 12:
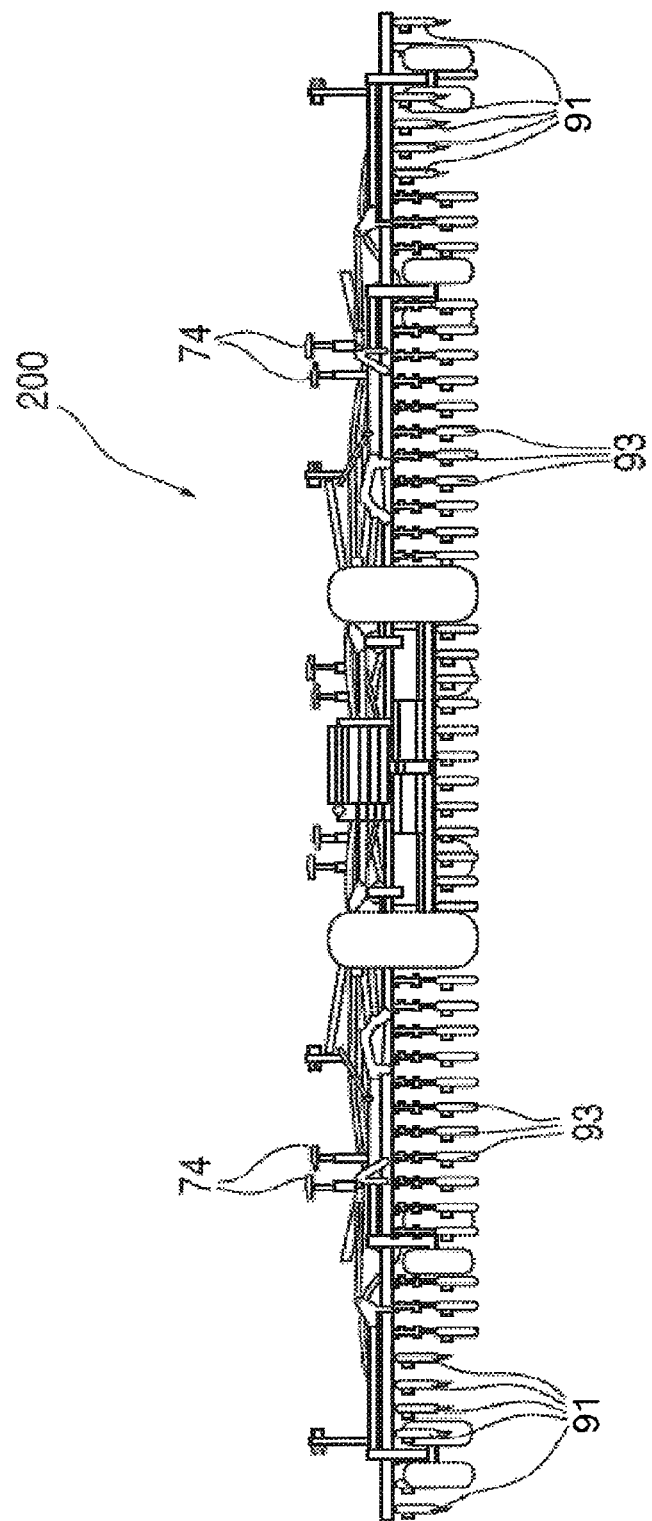
FIG. 12 is a front plan view of an air seeding apparatus depicting the soil openers in both lowered and raised positions.
Figure 13:
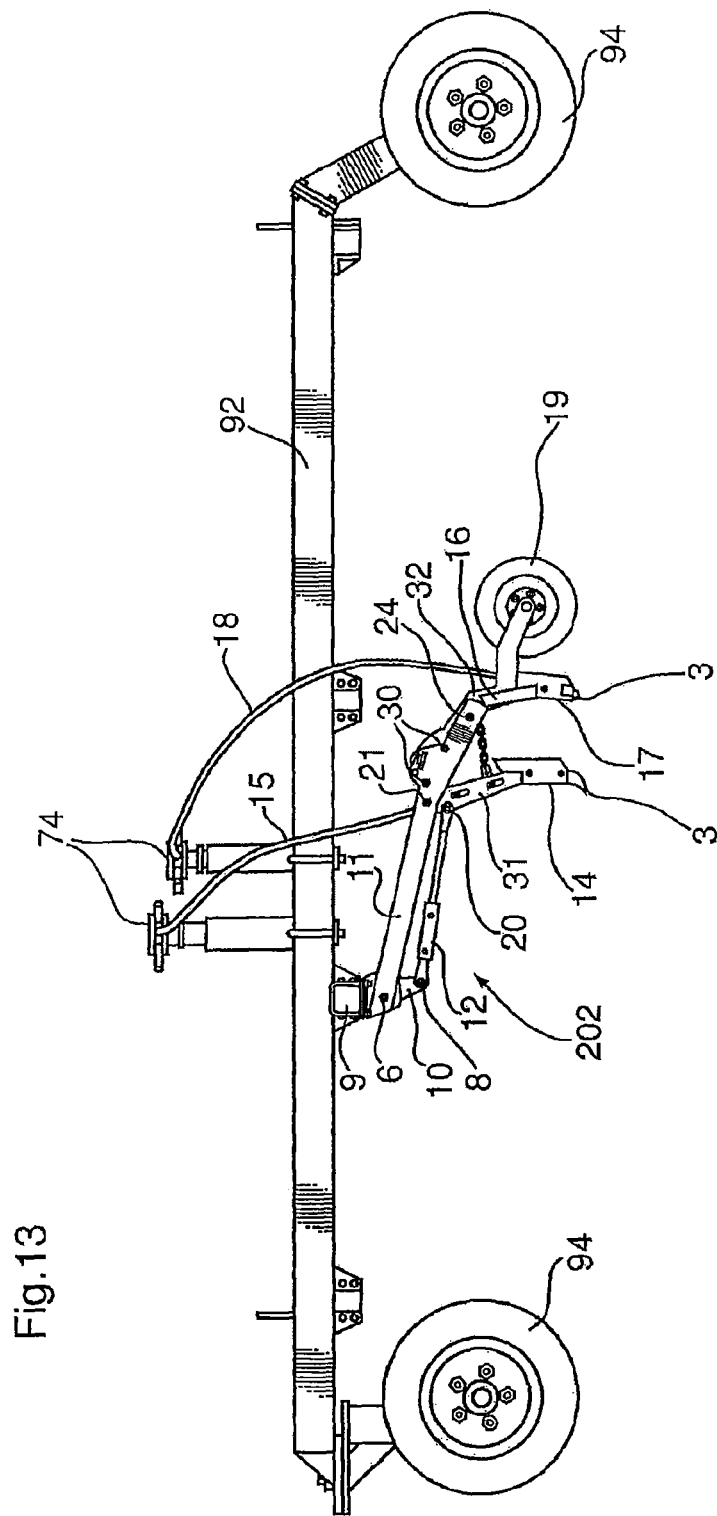
FIG. 13 is a cross-sectional side view of the agricultural implement of the present invention, showing the soil openers in the lowered position and pivotally mounted to a conventional frame.
Figure 14:
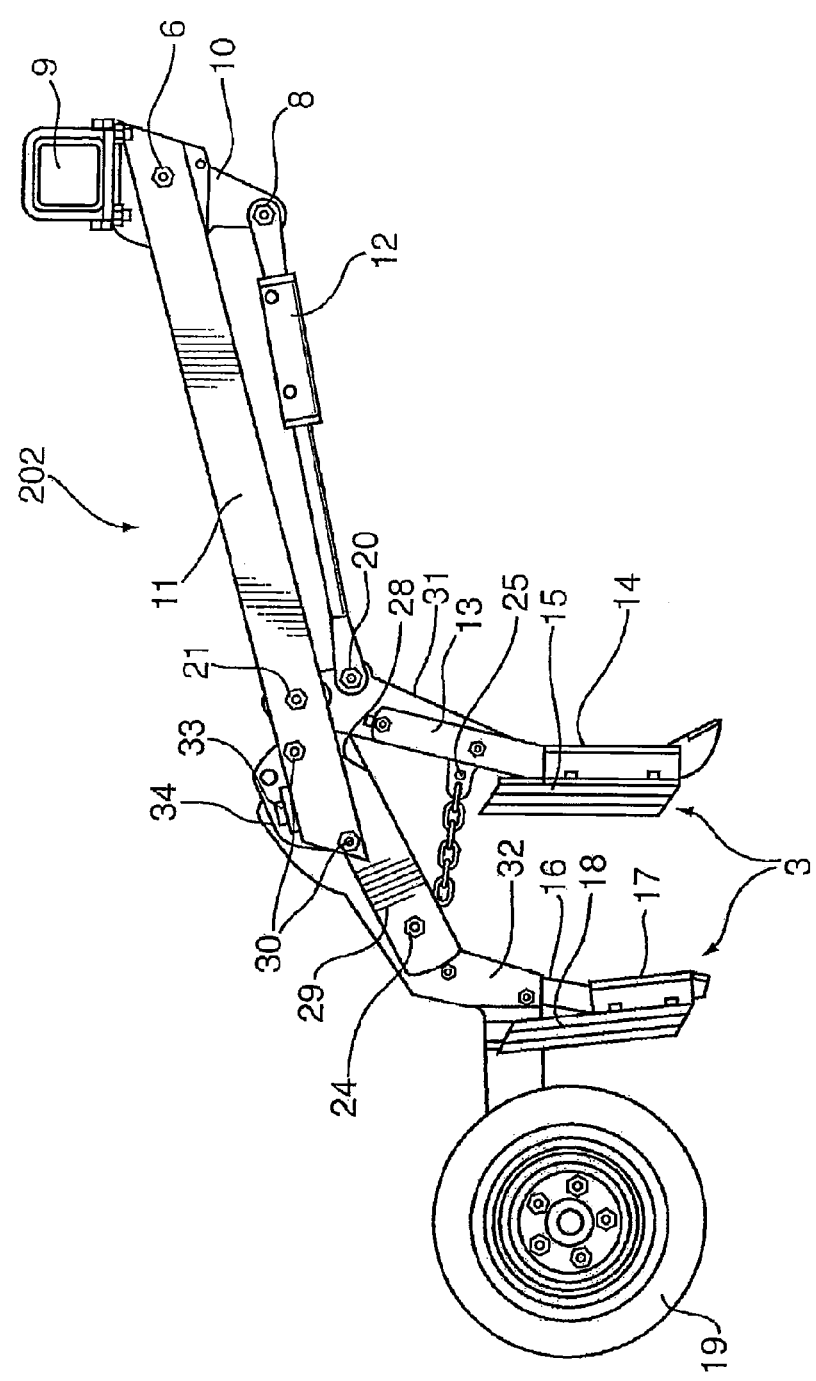
FIG. 14 is a cross-sectional side view of the agricultural implement of the present invention, with the soil openers in the lowered position.

FIG. 12 depicts a group of opener arm assemblies 202 in the raised position 91 so that they do not disturb the soil. Fertilizer hoses 84 and associated fertilizer tubes/hoses 15, and likewise seed hoses 82 and corresponding seed hoses/tubes 18, all associated with the opener arm assemblies 202 which are in the raised position 91, are closed to the flow of seed/fertilizer. Other opener arm assemblies 202 are shown in the lowered position 93, and the associated fertilizer tubes/hoses 15 and seed tube/hoses 18 are provided with fertilizer and seed to permit operation of the remaining operable opener arm assemblies 202 shown in lowered position 93.

Further, in another embodiment a GPS (Global Positioning System) or GNSS (Global Navigation Satellite System) guided system (not shown) is employed to automatically engage the electric actuator, hydraulic actuator, or electric over hydraulic cylinder actuator 80 and shaft 7 to close or open the gates 4 into an open or closed position, based on previous data determining where the seed or fertilizer has been previously deposited in the soil, to ensure that double seeding/fertilizing or over seeding/fertilizer does not occur.

Figure 16:
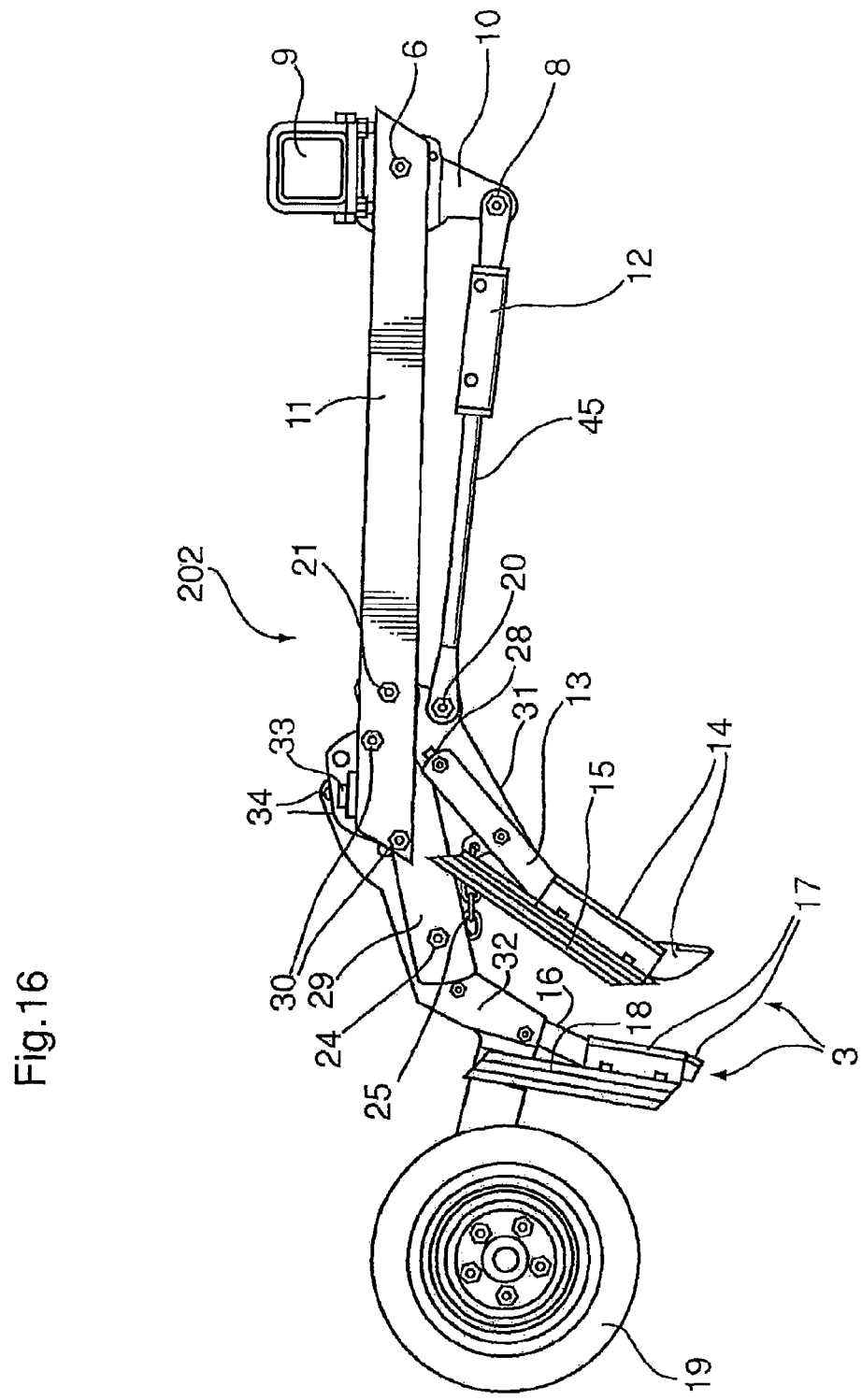
FIG. 16 is a cross-sectional side view of the agricultural implement of the present invention, with the soil openers in the raised position.

In one embodiment, as seen in FIGS. 13 to 16 an agricultural implement 200 consists of an opener arm 11 pivotally mounted at pivot joint 6 to a cross-member 9 which is fixedly mounted to a conventional frame 92. The conventional frame 92 is operatively connected to a plurality of ground-engaging wheels 94. The opener arm mounting bracket 10 is fixedly mounted via cross-member 9 to conventional frame 92. Hydraulically extendable arm 45, containing a biasing hydraulic ram 12, is pivotably coupled at one end 8 thereof to opener arm mounting bracket 10, at another end 20 to seed opener arm 31, such that the biasing hydraulic ram 12 rests substantially parallel and below the opener arm 11, as shown in FIG. 16. First mounting member 31 is pivotably connected to opener arm 11 at pivotal joint 21, such that mounting member 31 is below and roughly perpendicular in the operating (soil engaging) position to opener arm 11. Hydraulic ram 12 may be extended to cause mounting member 31 to pivot rearwardly, and upon being so pivoted to contact opener arm 11, to cause opener arm 11 to pivot about pivot joint 6 so as to become raised, thereby raising the opener arm 11, packer wheel 19, first mounting member 31 (hereinafter collectively the opener arm assembly 202) from engagement with the ground.

First mounting bracket 31 is fixedly connected to the first delivery system mounting member 13. The first delivery system mounting member 13 contains the first cutting knife 14 as well as the first product (eg fertilizer) delivery hose/tube 15 (usually for delivering fertilizer) behind the first cutting knife 14. Distal to the first delivery system mounting member 13 is a second delivery system mounting member 16 connected below and to a second mounting member 32. The second mounting member 32 is fixedly connected at point 24 to a mounting arm extension 29. A pin 33 and plurality of bolts 34 also adjustably connects the second mounting member 32 to opener arm 11. The pin and plurality of holes allow for vertical adjustment of the second delivery system mounting member 16. The second delivery system mounting member 16 is generally perpendicular to opener arm 11. The mounting arm extension 29 is rigidly connected to the opener arm 11 with two fixed bolts 30. The second delivery system contains a second cutting knife 17 as well as a second product (eg seed) delivery tube/hose 18 (usually for delivering seed) behind the second cutting knife 17. Both first and second delivery system members 13, 16 respectively, are collectively referred to as ground-engaging openers 3. A linked chain 25 connects the first and second ground-engaging openers 3 and limits the forward movement of the first ground-engaging opener.

A ground-engaging packer wheel 19 is connected to the distal end of the second mounting bracket 32. The packer wheel 19 follows the two delivery system mounting members 13, 16 and allows for packing of soil above the material which has been inserted in furrows created in the soil. The biasing hydraulic ram 12 is pivotally connected to both the frame mounting member 10 as well as the first mounting bracket 31 to be able to engage the first delivery system mounting member 13. When the hydraulic ram 12 is extended, the upper edge of the first delivery system mounting member 13 engages the front edge 28 of the mounting arm extension 29. The mounting arm extension 29 is then raised, thus raising the attached second delivery system mounting member 16, second pivot bracket 32 and packer wheel 19. The front edge 28 of the mounting arm extension 29 is sufficiently thick to support the weight of the second delivery system mounting member 16 as well as the second pivot bracket 32 and wheel 19 in a raised position for transport purposes. Reversing the hydraulic ram 12 by activating hydraulic shank valves 212 causes the corresponding opener arm assembly 202 to be lowered.

FIGS. 15 and 16 illustrates the agricultural implement 200 having the opener arm assemblies 202 in the raised position for transport. This allows for the agricultural implement 200 to be driven over a field that has been previously seeded without disturbing the seed bed. The biasing hydraulic ram 12 is controlled by a plurality of electric and/or hydraulic valves 112 (see FIGS. 9 & 20). This allows the operator to selectively raise either a single or multiple opener arm assemblies 202 from the cab of the vehicle.

The agricultural implement 200 is also contemplated as being configured such that it comprises only a plurality of single ground-engaging openers 3 and corresponding product delivery hose/tubes 18 and cutting knives 17 such that the agricultural implement 200 only delivers seed or fertilizer.

In one embodiment, a GPS ("global positioning system") or GNSS ("global navigate satellite system") control system 250, generally shown in FIG. 21, is provided to automatically control the opening and closing of the gates 4 of the meter shut-off devices 35a, 35b, as well as the raising and lowering of the opener arm assemblies 202 for agricultural implement 200. In an alternate embodiment, the control system 250 uses GPS/GNSS based information to visually and/or audibly alert the implement operator that the implement is crossing in or out of already seeded field sections or zones. In contrast to the automated embodiment described above, in this embodiment, the visual or audible alert is operative to inform the operator that selected meter shut-off devices need to be activated to effectively "turn off" metering of seed or other granular material to avoid reapplication of material to previously seeded areas. Alternately, the alert may be used to inform the implement operator to raise selected sections of the implement toolbar to withdraw those selected sections from engagement with the field so as to avoid disturbing previously seeded soil. The use of audible and/or visual alerts over a fully automated system gives operator control over the sectional control system and can be implemented in a less costly and complex manner than the fully automated system described herein.

In one embodiment, the GPS control system 250 allows automatic control of not only coils 102 for controlling the meter valves 111 which in turn actuate/control hydraulic cylinder actuators 80 and thus associated gates 4 on meter shut-off devices 35*a*, 35*b*, but as well controls coils 104 for shank hydraulic valves 112, which in turn control the biasing hydraulic rams 12 on the opener arm assemblies 202 to raise selected opener arm assemblies 202 for areas that are mapped using the GPS system and known to already have be seeded, to thus prevent disturbing an already-planted seed bed.

The control system 250 is generally comprised of a data processing unit 252 that can communicate with various external systems, such as a remote computer 254, via a memory card 256. The memory card 255 may be used to transfer information between the remote computer 254 and the data processing unit 252. This information could include data that provides control of various systems of the implement. For example, the information could be used to input seed type, seed rate, fertilizer type and rate, herbicide type and rate, etc. that is used to provide electronic control of the metering systems. The information may also include geographical maps of the field to be seeded to provide real-time navigational feedback to the implement operator as the implement is traversing the field. It is understood that the memory card 255 could take many forms and includes hard disks, CD ROMs, floppy diskettes, as well as wireless/Bluetooth transmissions.

The data processing unit 252 communicates with an operator interface 256 in a known manner. The operator interface 256 may include, for example, a graphical user interface (GUI) 258 that provides cursor control, such as by a mouse or joystick. The operator interface 256 may further include a keyboard 260 or other I/O devices.

The data processing unit 252 generates display signals applied to a reconfigurable display 262, which may be of the CRT or flat screen varieties. The display 262 may include an active-matrix LCD display capable of displaying alphanumeric characters, graphics and full motion video in a number of colors under varying ambient light conditions. Display 262 is used, among other things, to display the configuration of implement 26 and row units 96 thereon, product application data (e.g., status, prescription application and control data), and real-time position of the implement 26 relative to a topographical or geographical map. The data processing unit 252, interface 256 and display 262 are preferably located in the operator cab of the implement or towing tractor.

The data processing unit 252 also communicates with a location signal generation circuit, indicated at 264 by the dashed enclosure, which generates location signals representing the position of tractor 20. The circuit 264 includes a global positioning system (GPS) receiver 266 with an associated antenna 268, and a differential GPS (DGPS) receiver 270 with an associated antenna 272. A single antenna may be used in place of the antennas. The GPS receivers may be of a known type or design. The GPS receiver 266 determines longitude and latitude coordinates and the altitude of the vehicle 20 from signals transmitted by the GPS satellite network. The accuracy of the position data is improved by applying correction signals received by DGPS receiver 270. The differential correction signals are used to correct errors on GPS signals including the selective availability error signal added to GPS signals by the U.S. Government. DGPS correction signals are transmitted by the U.S. Coast Guard and/or commercial services.

From the position of the GPS antenna 266 and DGPS antenna 268, the data processing unit 252 can derive the geographical positions of each of the row units 96 by determining direction of travel 28 (FIG. 1) and adding an x/y offset for each of the row units. The direction of travel 28 can be obtained from a gyrocompass 274. The direction of travel 28 may alternatively be determined by inspecting a last obtained point from the location signal generation circuit 264 and comparing it to the current location point. It is understood that the location signal generator circuit is representative of one type of circuit that may be used and, as such, other circuit configurations and/or types may be used to determine real-time position data of the tractor and/or implement.

As noted above, in one embodiment of the invention, location information is used to alert the implement operator that the implement is traversing over previously seeded and/or disturbed soil. This information can then be used by the operator to manually control operation of the metering system and/or engage or disengage select sections of the tool bar with the soil. In one embodiment, this "alert" takes the form of a visual indicator that is displayed on the display 262. The visual indicator could be in the form of a general alert or, preferably, is in the form of a change in the graphical display of the implement. For example, if data processing unit 252, from location information, determines that a portion of the implement is traversing over previously seeded and/or disturbed soil, the data processing unit 252 would generate and transmit display signals to the display 262 that causes the display 262 to illuminate, change color, and/or flash the corresponding sections of the graphical display of the implement that have been determined to be traversing previously seeded and/or seeded soil. Moreover, the data processing unit 252 can inform the operator of the shut-off assemblies to activate so that the corresponding sections of the implement are not metered seed.

In a further implementation, the data processing unit 252 may cause an alarm to be sounded when the implement is traversing over previously seeded and/or disturbed soil. In this embodiment, sounding of the alarm would alert the operator that the travel path of the implement needs to be verified. The data processing unit 252 may include an audio card 276 that generates audio signals that are transmitted to and processed by one or more speakers 280 to audibly alert the operator. The speakers 280 are preferably located in the operator cab. The audible alarm may be sounded alone or in combination with the visual alarm described above.

It will thus be appreciated that the present invention provides a system and method whereby an implement operator is visually and/or audibly alerted that the implement is traversing over previously seeded and/or disturbed soil to allow the operator to manually control the seed metering/application assemblies. The information conveyed to the operator preferably identifies with specificity which portions of the implement are traversing over the previously seeded soil. This specificity allows the operator in intelligently determine how to control the seed metering/application assemblies, e.g., activated selected seed metering shut-off valves and/or raise selected portions of the implement tool bar. In a preferred embodiment, the data processing unit 252 includes software that monitors operator response to the indication that the implement is traversing previously seeded soil and maintains the alarm until the operator has taken corrective action, either by controlling the seeding process appropriately or changing the position of the implement.

In a preferred embodiment, the data processing unit 252 determines, either automatically or from an operator input, that the implement is in a seeding condition or a transport condition. When the implement is in the seeding condition, the data processing unit 252 tracks movement of the implement and compares the real-time position of the implement to the tracked movement. However, when the implement is in the transport condition, the data processing unit 252 can either alert the operator when the implement has veered from a dedicated transport path or go to a standby mode until the implement is returned to a seeding condition. As noted above, these conditions can be determined automatically from feedback received from various sensors on the implement or directly from an operator input.

Many changes and modifications could be made to the invention without departing from the spirit thereof. The scope of these changes will become apparent from the appended claims.

The invention claimed is:

1. An agricultural implement for depositing particulate matter into soil, comprising:
    a drill having a plurality of soil engaging tools that are movable between a raised position and a lowered position, the soil engaging tools configured to be disengaged from the soil when in the raised position and configured to be engaged with the soil when in the lowered position;
    a satellite navigation system that maps movement of the implement when the soil engaging tools are in the lowered position and provides an output signal when the implement traverses a region of the soil that has been seeded;
    an alert that is activated when the satellite navigation system provides the output signal, the alert configured to notify an operator that the implement is traversing a region of the soil that has previously been deposited with particulate matter without automatically adjusting the deposition of the particulate matter into the region of the soil that has previously been deposited with particulate matter and to notify the operator of the implement that at least one of the plurality of soil engaging tools needs to be moved to the raised position; and
    a controller that maintains activation of the alert until the operator has taken a corrective measure to disengage the soil engaging tools from engagement with the soil that has been seeded.

2. The apparatus of claim 1 wherein the alert includes a light that is illuminated when the satellite navigation system provides the output signal.

3. The apparatus of claim 1 wherein the alert is an alarm that is sounded when the satellite navigation system provides the output signal.

4. The apparatus of claim 1 wherein the alert is located within an operator cab of the implement.

5. The apparatus of claim 1 further comprising an air cart coupled to the drill and configured to supply particulate matter to the drill.

6. The apparatus of claim 1 wherein the satellite navigation system is a GPS navigation system.

7. The apparatus of claim 1 wherein the controller maintains activation of the alert until the operator has moved the soil engaging tools to the raised position.

8. An agricultural implement for injecting material into soil, wherein the material is seed, fertilizer, or seed and fertilizer, comprising:
    a frame assembly including a central frame and a plurality of elongate mounting arms mounted to the central frame, each adapted to be moved from a raised position to a lowered position, and soil engagers mounted on each of the mounting anus and adapted to engage soil when each of the mounting arms is in the lowered position;
    a lifting arrangement operatively connected to the frame assembly for raising and lowering the frame assembly between the raised position and the lowered position; and
    an alert structure operatively connected to a satellite navigation system for alerting an operator of the implement that the satellite navigation system has determined that a portion of the frame assembly is traversing regions of soil which have been previously seeded, the alert structure notifying the operator that the implement is traversing a region of the soil that has previously been deposited with particulate matter without automatically adjusting the deposition of the particulate matter into the region of the soil that has previously been deposited with particulate matter and notifying the operator of the implement to manually activate the raising and lowering means to raise the frame assembly from the lowered position to the raised position.

9. The agricultural implement of claim 8 wherein the alert structure includes an audible alert that is sounded when the satellite navigation system has determined that a portion of the frame assembly is traversing regions of soil which have been previously seeded.

10. The agricultural implement of claim 8 wherein the alert structure includes one or more lights that are illuminated when the satellite navigation system has determined that a portion of the frame assembly is traversing regions of soil which have been previously seeded.

11. The agricultural implement of claim 8 wherein the alert structure is located within an operator cab of the implement.

12. The agricultural implement of claim 8 further comprising an air cart coupled to the frame assembly and configured to supply particulate matter to a material meter arrangement.

* * * * *